April 5, 1949.     R. Q. ARMINGTON     2,466,352
SWIVEL CONNECTIONS FOR HYDRAULIC HOISTS
Filed Feb. 19, 1945
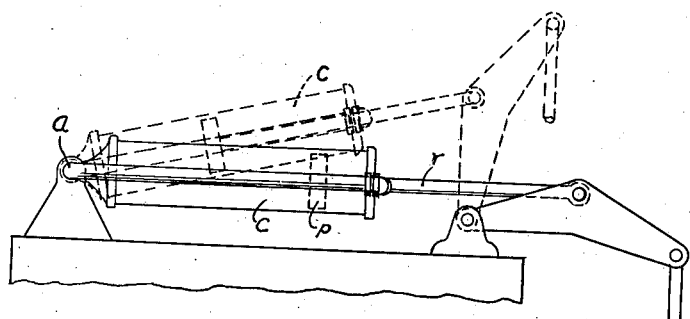
Fig. 1
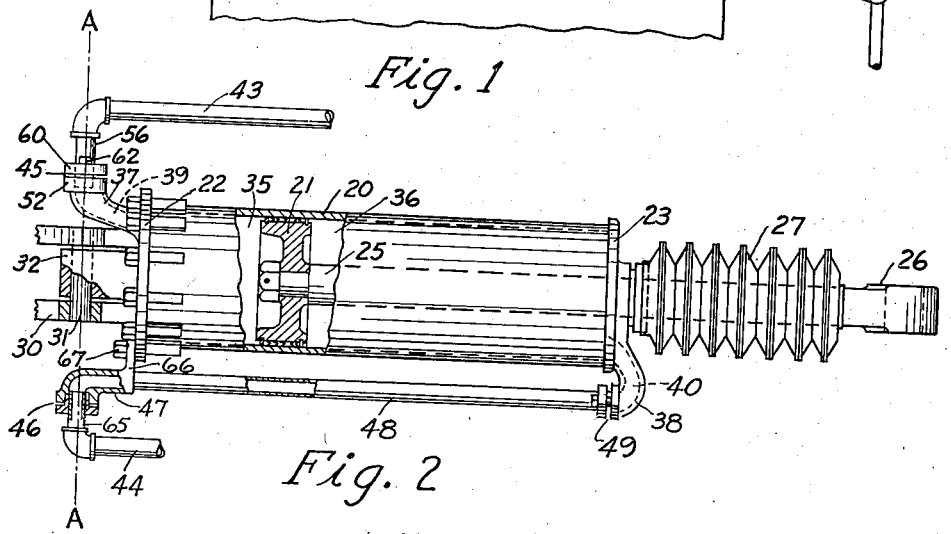
Fig. 2
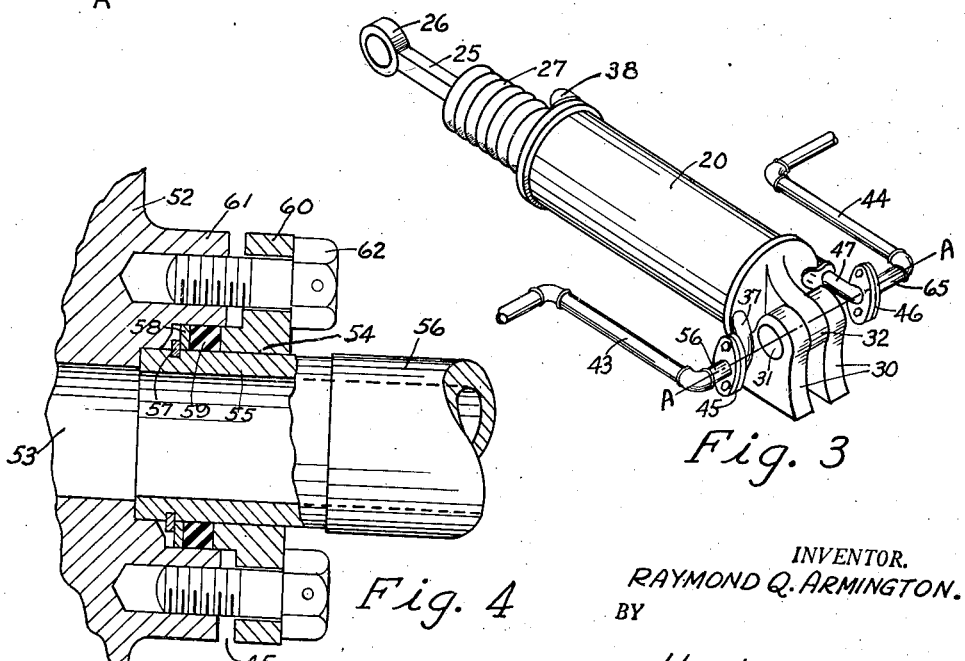
Fig. 3
Fig. 4
INVENTOR.
RAYMOND Q. ARMINGTON.
BY
Hyde and Meyer.
ATT'YS.

Patented Apr. 5, 1949

2,466,352

UNITED STATES PATENT OFFICE 2,466,352

SWIVEL CONNECTION FOR HYDRAULIC HOISTS

Raymond Q. Armington, Shaker Heights, Ohio, assignor to The Euclid Road Machinery Co., Euclid, Ohio, a corporation of Ohio Application February 19, 1945, Serial No. 578,611

2 Claims. (Cl. 121—46)

The invention relates to hydraulic power motors, and more particularly to motors of this type having a cylinder which is pivotally supported or suspended so as to be oscillatable around an axis of oscillation. Such a motor, in the form of a hydraulic jack or power hoist, is shown for example in my United States Patent No. 2,386,187, granted October 9, 1945, to which reference may be had for a disclosure of one practical adaptation thereof.

An object of the invention is to provide improved means for transmitting fluid power to an oscillatable power cylinder.

A further object of the invention is to provide improved fluid power transmission means suitable for use with an oscillatable cylinder for a fluid power motor, such means avoiding the use of flexible conduit.

A further object of the invention is to provide improved inflexible means of the nature indicated, said means being adapted to supply fluid power to an oscillatable cylinder from a plurality of supply sources through a plurality of conduits.

A further object of the invention is to provide an oscillatable cylinder having an inlet port provided with coupling means, said coupling means being located on the axis of oscillation of the cylinder, and said coupling means receiving fluid power from a conduit, the portion of the conduit next adjacent said coupling means being likewise located on said axis of oscillation.

A further object of the invention is to provide a cylinder for a fluid power motor, said cylinder being provided with supporting means of pivotable character whereby said cylinder is oscillatable about an axis of oscillation in said supporting means, said cylinder being further provided with one or more ports having attaching means in connection therewith, said cylinder being further provided with one or more fluid power transmitting conduits each having a part respectively attachable to one said attaching means for one said port, the connection between each said attachable port of said conduits to each said port coupling being of rotatably leak proof character, and being located on said axis of rotation.

A further object of the invention is to provide improved, nonflexible fluid power transmitting means for an oscillatable cylinder of the nature indicated, which means can be rapidly repaired or replaced as the occasion requires, but which means is adapted to be installed in relatively permanent assemblies, with little or no need for servicing, repair, or replacement.

Other objects and advantages will be immediately apparent, or will occur to those skilled in the art on a study of the accompanying drawings, in which:

Fig. 1 is a schematic showing of a fluid power motor adapted to oscillate with relation to supporting means responsive to position changes in the point of application of its power output;

Fig. 2 is a top plan view of a fluid power motor of the type schematically shown in Fig. 1, equipped with inflexible conduit means, in accordance with the present invention for the transmission of fluid power thereto, parts being broken away and/or in section to show internal structure;

Fig. 3 is a perspective view of a fluid power motor and supporting means constructed and mounted in accordance with the present invention;

Fig. 4 is a fragmentary view, partly in section and partly in elevation, and somewhat enlarged, of a coupling arrangement such as is used in Figs. 1 and 2.

In a double acting cylinder of the type wherein a piston reciprocates, as the fluid power is admitted alternately to two opposed chambers, the most practical construction requires that the piston rod be movable endwise without deviation from the longitudinal axis of the cylinder. If, however, the piston rod be applied to actuation of a crank or lever, pivoted at a fixed point, it is obvious that the cylinder and piston motor must be mounted to allow for angular displacement of the point of connection between the end of the piston rod and the crank pin or lever end. As has heretofore been recognized, and as is illustrated in schematic essentials in Fig. 1, the cylinder $c$ may be pivotally mounted to rock on an axis of oscillation, from the full line position to the dotted line position on a pivot at point $a$, so that as a result reciprocation of the piston $p$ and rod $r$ occurs on the longitudinal axis of the cylinder but the cylinder assembly rocks on said axis of oscillation. Such construction is familiar to those skilled in the art, but gives rise to further problems as will immediately appear.

It has been customary to introduce the fluid power to opposed ends of the cylinder through means including certain conduit portions which are sufficiently flexible to permit of cylinder oscillation, and in practice this was often done through rubber hose connections. In certain applications, such as excavating, hoisting, conveying, or grading devices, the work is carried on in all variety of climatic conditions and working hazards, involving the possibility of injury to flexible conduit of the type indicated, and repairs are difficult or inconvenient, or replacement parts may not be conveniently available.

In solving these problems I have devised a substantially permanent assembly for a fluid power motor, wherein oscillation of the cylinder is permitted, but wherein the fluid power transmitting conduit may be formed from rigid, relatively inflexible piping of the kind normally available, by use of a novel mode of arrangement and connection of said piping with respect to the cylinder. The objects of the present invention are substantially achieved when connection between said inflexible conduit and said oscillatable cylinder is made at a coupling having complementary parts, one part fixed with respect to the cylinder and the other part fixed with respect to the conduit, one said part being rotatable with respect to the other said part, and the coupling point being located on the axis of oscillation of the cylinder.

Referring now to Figs. 2 to 4 illustrating one embodiment of the present invention, the drawings show a fluid power motor comprising a cylinder 20 of the double acting type, within which a piston 21 reciprocates. The cylinder, for the most part, is of conventional form, having opposed end heads 22 and 23, head 23 being apertured and packed by means not shown to permit passage therethrough of piston rod 25, one end of said rod being affixed to piston 21. The rod end remote from piston 21 is provided with conventional means 26 for attachment to a crank pin or other movable point of power application. The external portion of rod 25 which is in slidable contact with the cylinder head 23 is provided with an extensible bellows 27 for dust and dirt protection.

Cylinder 20 is mounted to oscillate in a supporting bracket 30 disposed adjacent head 22. A pin 31 is carried transversely between a pair of bifurcated arms of bracket 30, which forms a part of any suitable supporting means not here shown, and cylinder head 22 has rigid therewith a bushed member 32 which swivels on pin 31. Consequently, when the motor is in operation, the cylinder, piston and rod oscillate on an axis coincident with the axial center line of pin 31.

An adequate operating clearance may be provided between arms 30 and the bushed member 32 to allow for a certain amount of misalignment between the pivot and the crank end of the piston rod. For this and other reasons the fixed pipe supports may be placed at some distance from the cylinder to permit limited flexing of the piping system.

The motor here shown is of the double action type, fluid power being admitted, alternately to chambers 35 and 36 by valving means not shown.

I have discovered that power fluid may be supplied to either or both chambers 35 and 36 through conventional metallic conduit, without the use of flexible pipe sections, if a portion of each separate supply conduit is coincident with the axis of oscillation of the cylinder, and if such coincident portion is provided with two complementary parts, one part immovable with respect to said cylinder and another part rotatably movable with respect to said cylinder, the axis of rotation of said rotatable part being coincident with the axis of oscillation of the cylinder. One means of assembly whereby this is accomplished will now be described.

Adjacent each end of the cylinder, and here shown as integral with cylinder heads 22 and 23, I provide fluid inlet fittings 37 and 38 respectively. Fittings 37 and 38 are provided with respective through passages or inlet ports 39 and 40. Pressure fluid from supply conduits 43, 44 is transmitted respectively to inlet ports 39, 40 through rotatable couplings 45, 46 which lie on the axis of oscillation of the cylinder. Coupling 45 is directly in communication with inlet port 39. Coupling 46 is in communication with inlet port 40 through elbow 47, conduit 48, and coupling 49. Referring to the drawings the structure of said couplings 45 and 46 will be immediately apparent, but will be briefly characterized with special reference to Figs. 2 and 4.

The coupling, as shown in enlarged form in Fig. 4 comprises a female member 52 provided with a bored passage 53 having an enlarged unthreaded socket portion 54 adapted to receive the male member 55 which in the present instance is the unthreaded end of conduit nipple 56. Connection between the complementary members is maintained as follows. A split ring 57 is snapped into place in an annular groove on member 55 which serves as a stop for a backing washer 58 and a packing ring 59, the assembly being compressed and retained by a gland 60 secured to the flange 61 of the member 52 by cap screws 62. The manner of assembly just described permits relative rotary motion between members 52 and 55. The axis of rotation lies along the axis of nipple 56, and said axis of rotation is designed to coincide with the axis of pin 31, namely the axis of oscillation of the cylinder.

Since coupling 46 corresponds in structure and location to coupling 45, the purpose of disposing coupling 46 in the position shown will now be evident. Coupling 46 is likewise provided with a nipple 65 relatively rotatable therein, analogous to rotation of nipple 56 in coupling 45. To maintain coupling 46 rigid with respect to the cylinder, elbow 47 is equipped with a flange 66 secured to head 22 in any convenient manner, as by cap screws 67.

From an examination of Figs. 2 or 3 it will be apparent that cylinder 20, and the portions of couplings 45 and 46 which are immovable relative thereto, may be oscillated around the axis A—A without disturbing the position or disposition of supply conduits 43, 44. I have consequently described and shown means whereby all fluid supply connections can be fabricated from metal, or other nonflexible material, so that the structure may be expected to withstand normal work hazards, and so that ordinary servicing may be readily taken care of with normally available parts. If a leak occurs on the job, temporary repairs may be made by wrapping any packing material to replace ring 59.

By having the supply pipes 43 and 44 attached only by the swivel joints near the cylinder head, leaving several feet of free piping, moderate twisting and swaying of the motor cylinder, following wear at its pivot point, is permitted without putting undue stress on the fluid connections which might cause damage or breakage.

While the spacing of the couplings 45, 46 (Figs. 2 to 4) opposed diametrically with respect to cylinder 20 or 70 represents, in many instances, the most favorable arrangement from the standpoint of static and dynamic balance, the couplings may obviously be opposed on a line which is off the cylinder diameter. It is of course necessary that the couplings have a common axis of rotation, and if there is also a suspension point for oscillation of the motor, it is further necessary that the said axis of coupling rotation coincide with the axis of movement or oscillation at the suspension point.

I have shown several embodiments in which the couplings have two relatively rotatable parts, one telescopingly insertable in the other. It will be immediately apparent that in any particular coupling, any desired change or substitution may be made in the arrangement of the parts, provided there is a leak proof, relatively rotatable attachment which is on the axis of oscillation.

What I claim is:

1. In a fluid power motor having a cylinder and a piston with associated rod reciprocable therein, the combination of a single relatively narrow pivotal mounting for said cylinder substantially in line with said rod and at the end of said cylinder opposite said rod, the pivotal axis of said mounting being at right angles to the axis of said rod, and pressure fluid inlet and outlet conduits for said motor of relatively inflexible material having relatively rotatable swivel connections located on the axis of said pivotal mounting and independent of said mounting, said conduits being free and unsupported close to said mounting other than by their connections with said motor, whereby moderate misalinement between said mounting and said piston rod, in a plane including said pivotal axis and said rod axis, may be accommodated.

2. In a fluid power motor having a cylinder and associated piston and rod reciprocable therein, the combination of a single pivotal mounting for said cylinder at the end of said cylinder opposite said rod, said mounting providing a pivotal axis at right angles to the axis of said rod, pressure fluid inlet and outlet conduits for said motor of relatively inflexible material, each of said conduits having a swivel connection free and unsupported other than by said motor and conduits, each of said swivel connections having associated relatively rotatable parts, one of said parts of each swivel connection having a conduit connection with said cylinder, the other of said parts of each swivel connection having one of said conduits extending away therefrom free and otherwise unsupported close to said swivel connection, and said swivel connections having axes of rotation located substantially on the pivotal axis of said mounting.

RAYMOND Q. ARMINGTON.

REFERENCES CITED

The following references are of record in the file of this patent:

UNITED STATES PATENTS

| Number | Name | Date |
|---|---|---|
| 110,352 | Forrester | Dec. 20, 1870 |
| 231,551 | Fiske | Aug. 24, 1880 |
| 264,746 | Pendleton | Sept. 19, 1882 |
| 467,766 | Oliver | Jan. 26, 1892 |
| 483,014 | Powers | Sept. 20, 1892 |
| 559,591 | Mullen | May 5, 1896 |
| 944,724 | Evered | Dec. 28, 1909 |
| 1,025,605 | Anderson | May 7, 1912 |
| 1,157,749 | Young | Oct. 26, 1915 |
| 1,226,528 | Jones | May 15, 1917 |
| 1,394,245 | Berry | Oct. 18, 1921 |
| 2,113,044 | Eisenberg | Apr. 5, 1938 |
| 2,374,045 | Soucia | Apr. 17, 1945 |
| 2,382,457 | Wertman et al. | Aug. 14, 1945 |

FOREIGN PATENTS

| Number | Country | Date |
|---|---|---|
| 465,429 | France | Feb. 6, 1914 |